United States Patent [19]

Reuter et al.

[11] Patent Number: 4,953,821
[45] Date of Patent: Sep. 4, 1990

[54] SUSPENSION APPARATUS FOR CONTROL DEVICES, CONTROL PANELS, OR THE LIKE

[75] Inventors: Wolfgang Reuter, Burbach-Wurgendorf; Jurgen Debus, Dietzholztal; Lothar Lehr, Burbach-Oberdresselndorf, all of Fed. Rep. of Germany

[73] Assignee: Rittal-Werk Rudolf Loh GmbH & Co. KG, Fed. Rep. of Germany

[21] Appl. No.: 313,224

[22] Filed: Feb. 21, 1989

[30] Foreign Application Priority Data

Feb. 22, 1988 [DE] Fed. Rep. of Germany ....... 3805425

[51] Int. Cl.$^5$ ............................................. E04G 13/00
[52] U.S. Cl. ..................................... 248/276; 248/282
[58] Field of Search ................. 248/276, 278, 281.1, 248/282, 284, 289.1, 291, 274, 324, 49

[56] References Cited

U.S. PATENT DOCUMENTS

| | | | |
|---|---|---|---|
| 3,981,340 | 9/1976 | Anderson et al. | 248/324 X |
| 4,391,426 | 7/1983 | Gothberg | 248/49 |
| 4,651,966 | 3/1987 | Suzuki | 248/282 |
| 4,699,046 | 10/1987 | Bellieni | 248/281.1 X |
| 4,715,077 | 12/1987 | Shepheard | 248/49 X |
| 4,836,486 | 6/1989 | Vossoughi et al. | 248/281.1 |

FOREIGN PATENT DOCUMENTS 3034013  9/1980  Fed. Rep. of Germany .

Primary Examiner—Ramon O. Ramirez
Attorney, Agent, or Firm—Thomas W. Speckman; Douglas H. Pauley

[57] ABSTRACT

This invention relates to a suspension apparatus for control devices, control panels and the like, which can be assembled from a connection flange or connection rotary joint, support body sections, angle units, and intermediary joints which can be connected with a wall or a machine body, and a coupling unit which can be connected with the control device, the control panel or the like. There is a stable support body section providing easy installation of the connection lines and a simple connection with the adjacent parts of the suspension apparatus. The support body sections comprise an essentially U-shaped base profile section which with a separating bar proceeding in parallel to its bar is divided into a closed support part and an open, U-shaped mounting part turned away from the bar. Longitudinally directed connection bars with penetrating threaded reception mountings are integrally formed both on the support part as well as on the mounting part. The lateral limb sections of the reception mounting part proceed into the connection ends with longitudinally directed, penetrating rear-cut sections. A cover profile section which is U-shaped in cross-section, the lateral limbs of which have longitudinally directed, penetrating suspension or locking attachments, can be connected in a releasable manner with the connection ends of the reception mounting part. The reception mounting profile can thus be closed.

21 Claims, 4 Drawing Sheets

4,953,821

SUSPENSION APPARATUS FOR CONTROL DEVICES, CONTROL PANELS, OR THE LIKE

BACKGROUND OF THE INVENTION

This invention relates to a suspension apparatus for control devices, control panels and the like, which can be assembled from a connection flange or connection rotary joint, support body sections, angle units, and intermediary joints which can be connected with a wall or a machine body and a coupling unit which can be connected with the control device, the control panel or the like.

With the connection flange, the connection rotary joint, the intermediary joints and the coupling unit, it is possible to have a universal rotating capacity of the control device attached on the end of the suspension apparatus. The support body sections and the angle units permit a height and lateral adjustment between the connection point of the suspension apparatus on the wall or the machine body and the control device or control panel.

Known suspension apparatuses of this type use hollow profile sections as support body sections for strength. This has the disadvantage that the electrical connection lines and other lines have to be routed from the machine to the control device through the support body sections, as well as the angle units and the rotary joints. This application is complicated and time-consuming.

There are other known suspension apparatuses in which the support body sections are constructed as U-profile sections. After the insertion of the connection lines, the support body sections are covered with a covering piece. These support body sections facilitate the positioning of the connection lines. However, they must have a relatively large cross-section in order to be able to absorb a sufficiently great magnitude of stress.

In addition, in both known suspension apparatuses, the connection of the connection flange, the connection rotary joint, the intermediary joints, the angle units and the coupling unit to the support body sections is complicated and expensive.

SUMMARY OF THE INVENTION

It is one object of the invention to provide a suspension apparatus of the type stated above with a support body section which with a simple installation of the connection lines has excellent stability and can be simply connected with a connection flange, a connection joint, an intermediary joint, and a coupling unit.

According to one embodiment of this invention, the support body section comprises an essentially U-shaped base profile section which is divided, with a separating bar proceeding parallel to its bar, into a closed support part and an open U-shaped mounting part turned away from the bar. Longitudinally directed connection bars with penetrating threaded reception mountings are integrally formed both of the support part as well as the reception mounting part. The lateral limb sections of the reception mounting part proceed into connection ends with longitudinally directed, penetrating rear-cut sections. A cover profile section, U-shaped in cross-section, having lateral limbs provided with longitudinally directed, penetrating suspension or locking attachments, can be removably connected with connection ends of the reception mounting profile so that the mounting profile can be sealed. The support part of the base profile section provides the necessary stability for the support body section. The reception mounting part can easily accommodate the connection lines with simple insertion when the cover profile section is removed. The cover profile section can easily be connected with the base profile section and removed without separate mounting elements, such as screws or the like.

According to one embodiment, the connection bars are integrally formed on internal sides of the lateral limb sections of the support part and of the reception mounting part. At least one pair of connection bars directed towards one another are positioned in the support part and in the reception mounting part. The connection points to the connecting parts, such as connection flange, connection rotary joint, intermediary joint, angle unit or coupling unit, lie within the approximately rectangular external contour of the support body section.

Regarding the construction of the connection bars, the threaded reception mountings are opened in the connection bars with penetrating slot apertures. The slot width is dimensioned so that the threaded reception mountings extend over more than 180 degrees, preferably approximately 270 degrees, of their circumference. Thus, it is easy to remove this from the mold during the production of the base profile. Thus, a sufficient hold of the mounting screws in the threaded reception mountings of the connection bars is guaranteed.

According to one preferred embodiment, the screw reception mountings of the connection bars are positioned with their central longitudinal axes at approximately the same distance to the bar which divides the base profile section into the support part and the reception mounting part. Thus, a mounting symmetrical to the bar of the base profile section can be obtained.

According to another embodiment, the bar on the side turned to the reception mounting has a central penetrating T-groove and the connection lines can be fixed in the reception mounting part. Mounting elements can be inserted at any chosen point in the T-groove and fixed by rotating, through which one portion of the mounting element is rotated into the expanded range of the T-groove.

For connecting the cover profile section with the reception mounting part of the base profile section, the rear-cut sections are positioned on the external sides of the lateral limb sections of the reception mounting part and the suspension and locking attachments are positioned on the internal sides of the lateral limbs of the cover profile section. Thus in this embodiment, the connection ends of the lateral limb sections of the reception mounting part are displaced internally and the cover profile section connected with the reception mounting part closed, with the external sides of its lateral limbs, lies snugly with the external sides of the lateral limb sections of the reception mounting part of the base profile section.

The connection of the base profile section of a support body section with a connecting part, such as connection flange, connection rotary joint, intermediary joint, angle unit or coupling unit, can easily be attained by having the connection flange, the connection rotary joint, the angle unit, the intermediary joint and the coupling unit with a mounting plate which has screw connecting pieces, or the like, oriented toward the connection bars with the threaded reception mountings. With integrally formed wall parts it accommodates and guides the base profile section, at least partially on its circumferential side.

In order to secure orientation for the support body section on the mounting plate, one further embodiment provides that the bar of the base profile section is held between wall parts and a centering plate integrally formed on the mounting plate. An adjusting plate having clearance integrally formed on the mounting plate abuts on the separating bar of the base profile section. A threaded boring, in which an adjusting screw abuts on the separating bar, is screwed into the adjusting plate. The mounting surface is slightly inclined to the mounting plate.

In another orientation, a threaded boring for an adjusting screw which abuts on the front side of the separating bar of the base profile section of the support body section is attached to the mounting plate.

BRIEF DESCRIPTION OF THE DRAWINGS

This invention is further illustrated in one embodiment shown in the drawings wherein.

DESCRIPTION OF THE PREFERRED EMBODIMENTS

Figure 1:
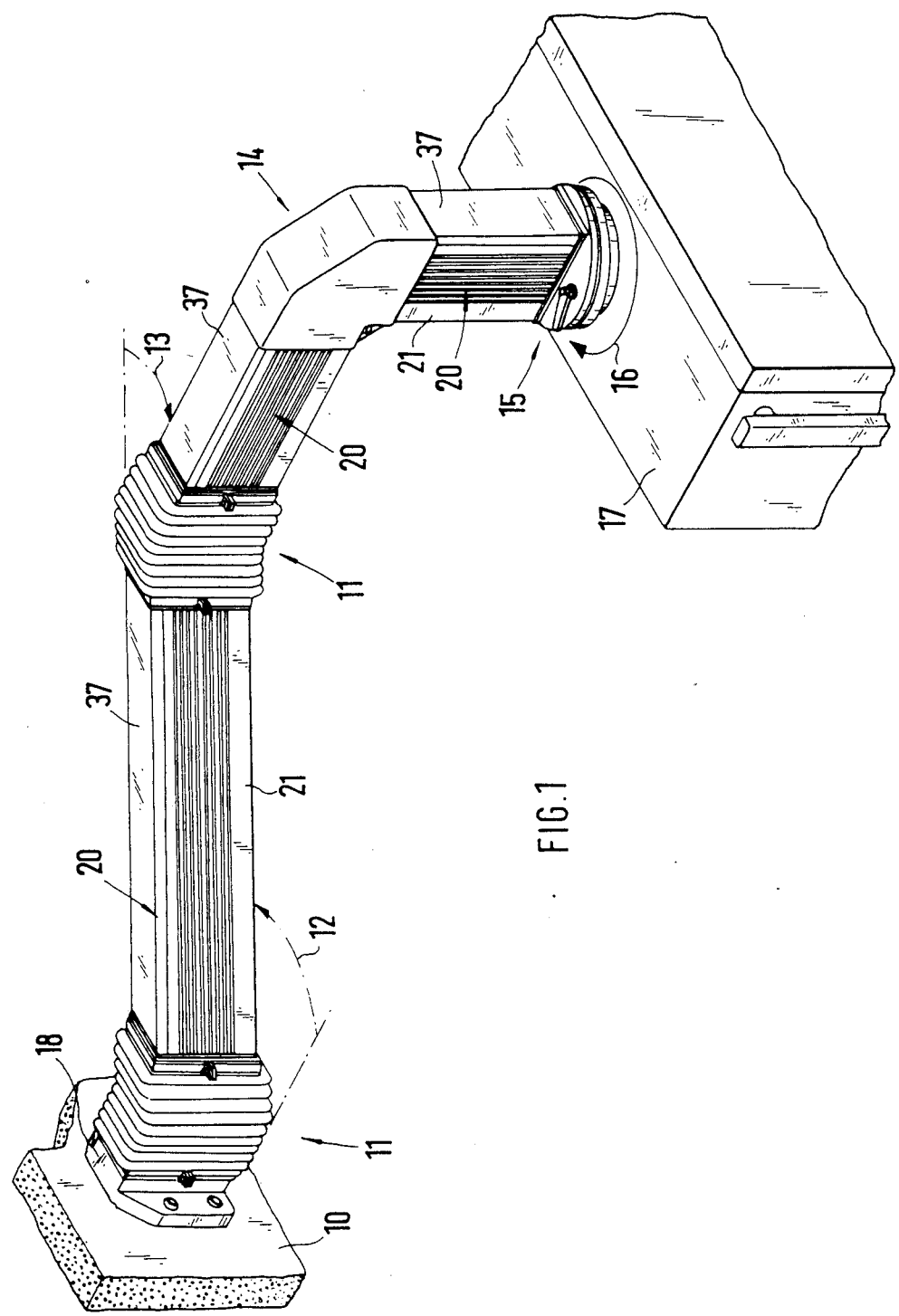
FIG. 1 is a complete suspension apparatus in a perspective view.
Figure 2:
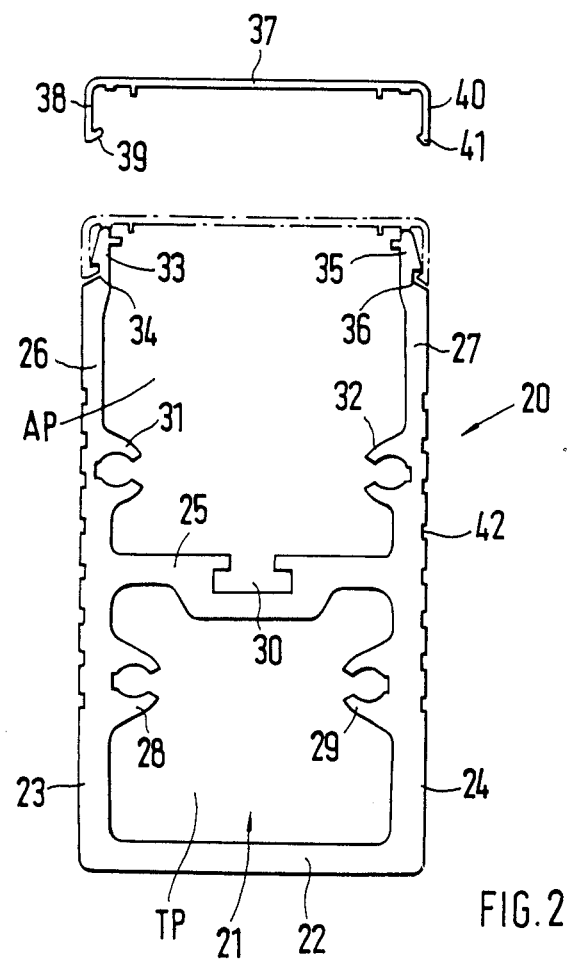
FIG. 2 is an end view of the support body section.

A wall or a machine body to which the suspension apparatus constructed as a support beam is attached, is designated by reference number (10) in FIG. 1. The connection flange (18) is connected with the part (10). An intermediary joint (11) which is covered with a bellows unit is connected to the connection flange (18). The connection flange (18) and the intermediary joint (11) can also be constructed as a connection rotary joint, and represent one unit. The first horizontally-directed support body section (20) which comprises a base profile section (21) and a cover profile section (37) connects with the same. The support body section (20) can be rotated on the connection rotary joint, as the angle of rotation (12) shows. An additional horizontal support body section (20), which is connected with the vertical support body section (20) by means of the angle unit (14) connects to the support body section (20) with the intermediary joint (11) which is covered with a bellows piece. The rotating angle (13) shows that both the horizontal support body sections (20) can be rotated against one another. The lower end of the vertical support body section (20) is connected with the coupling unit (15) which supports the control device (17). With the coupling unit (15), the control device (17) can be rotated on the vertical support body section (20), as indicated by the circle of rotation (16). The suspension apparatus according to FIG. 1 represents only one embodiment. The support body sections (20) have various lengths. The individual parts can also be constructed, in another sequence, into another suspension apparatus.

In order to make the support body sections (20) available in different lengths, the base profile section (21) is divided into the necessary lengths by means of a corresponding profile section. The base profile section (21) is essentially U-shaped whereby the lateral limb sections (23 and 26, and 24 and 27) connect with the bar (22).

The separating bar (25) which is parallel to the bar (22) divides the base profile section (21) into the support part (TP) and the mounting part (AP). The support part (TP) is a closed hollow profile of the bar (22), the lateral limb sections (23 and 24), and the separating bar (25). The reception mounting part (AP) is formed by the separating bar (25) and the lateral limb sections (26 and 27). It is open on the side of the base profile section (21) turned away from the bar (22) and it serves as an accommodation for the connection lines. The support part (TP) gives the base profile section (21) excellent stability and the open reception mounting part (AP) facilitates insertion of the connection lines. The lateral limb sections (26 and 27) proceed into the connection ends (33 and 35) which are provided with rear-cut sections (34 and 36). The reception mounting part (AP) is closed with the U-shaped cover profile section (37), the lateral limbs (38 and 40) of which have a suspension attachment (39) or a locking attachment (41). If the suspension attachment (39) of the lateral limb (38) is mounted in the rear-cut section (34) of the connection end (33) of the lateral limb section (26) then upon locking the cover profile section (37), the locking attachment (41) of the lateral limb (40) engages with the rear cut section (36) in the connection end (35) of the lateral limb section (27). The cover profile section (37) can easily be removed by eliminating such locking connection from the reception mounting part (AP) of the base profile section (21).

Figure 3:
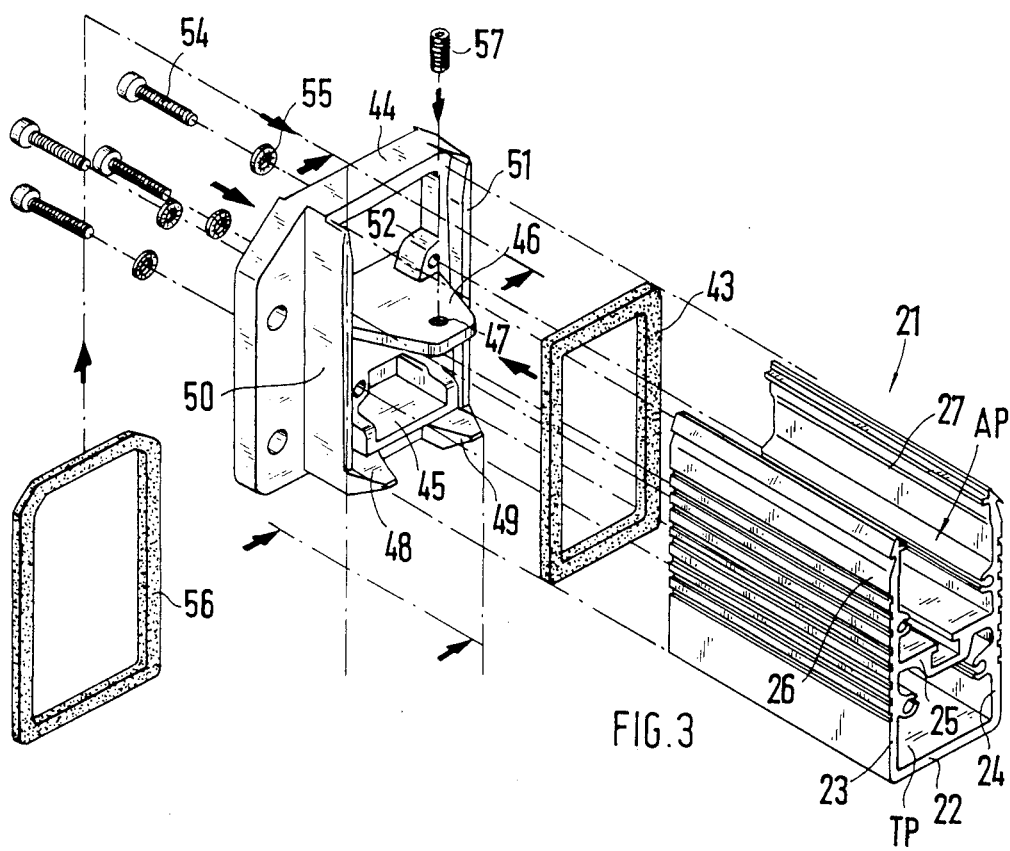
FIG. 3 is an exploded perspective view of the connection between the base profile section of a support body section with the mounting plate of a connection flange, a connection rotary joint, an intermediary joint, an angle unit or a coupling unit.
Figure 4:
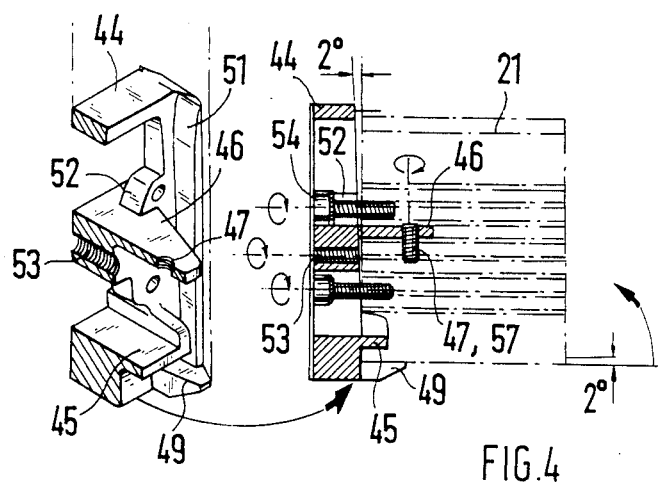
FIG. 4 is a schematic view of the alignment of the base profile section on the mounting plate.

The connection ends (33 and 35) are displaced far enough internally, relative to the lateral limb sections (26 and 27), that the cover profile section (37) with the external sides of its lateral limbs (38 and 40) snugly locks with the external sides of the lateral limb sections (26 and 27). The rear cut sections (34 and 36) are longitudinally directed and penetrating. A cover profile section (37) having the same length has a longitudinally directed and penetrating suspension attachment (39) or locking attachment (41). Longitudinally directed, penetrating connecting bars (28, 29, 31 and 32) with threaded reception mountings are integrally formed on the internal sides of the lateral limb sections (23, 24, 26 and 27). The threaded reception mountings are opened with penetrating slot apertures so that they can easily be removed from the mold. The width of the slot apertures is such that the threaded reception mounting extends over more than 180 degrees of its circumference, preferably over 270 degrees. The slot apertures facilitate the production of the base profile section (21) in the extrusion press process. The pairs of the connection bars (28 and 29, and 31 and 32) in the support part (TP) or the mounting part (AP) are oriented toward one another and the central longitudinal axes of the threaded reception mountings have approximately an equal distance to the separating bar (25). With the help of the threaded reception mountings, a mounting plate (44) can be easily attached to the front sides of the base profile section (21), as shown in FIGS. 3 and 4. This mounting plate (44) can be the connection plate or only one part of the connection rotary joint, of the intermediary joint, of the angle unit or of the coupling unit.

The mounting plate (44) has the protruding wall parts (48, 49, 50 and 51) which provide guidance and a circumferential mounting reception for the base profile section (21). The screw connection pieces (52) are oriented toward the threaded reception mountings of the connection bars (28, 29, 31 and 32) so that the mounting plate (44) can be screwed with the front side of the base profile section (21), using the mounting screws (54) through the interposition of the washer disks (55). The centering plate (45) which is integrally formed with the mounting plate (44) having the wall parts (48 and 49) accommodates the bar (22) in an unequivocal manner providing a coordination between the mounting plate (44) and the front side of the base profile section (21). The adjustment plate (46), integrally formed on the mounting plate (44), is positioned with clearance over the separating bar (25). The adjusting screw (57) which abuts on the separating bar (25) is screwed into the threaded boring (47) of the adjusting plate (46). If the mounting surface of the mounting plate (44) is slightly inclined, for example by 2 degrees, then with the adjusting screw (57) the base profile section (21) can be oriented to the mounting plate (44) thus providing an unequivocal horizontal or vertical adjustment of the base profile section (21) and thus of the support body section (20), even under stress.

The adjustment can also be accomplished with an adjusting screw which is rotated into the threaded boring (53) of the mounting plate (44) and abuts on the front side of the separating bar (25) of the base profile section (21). The sealing element (43) can thus be positioned between the mounting plate (44) and the base profile section (21). The sealing element (56) seals the mounting plate (44) to the connecting part, for example, of a wall or a machine body.

Figure 5:
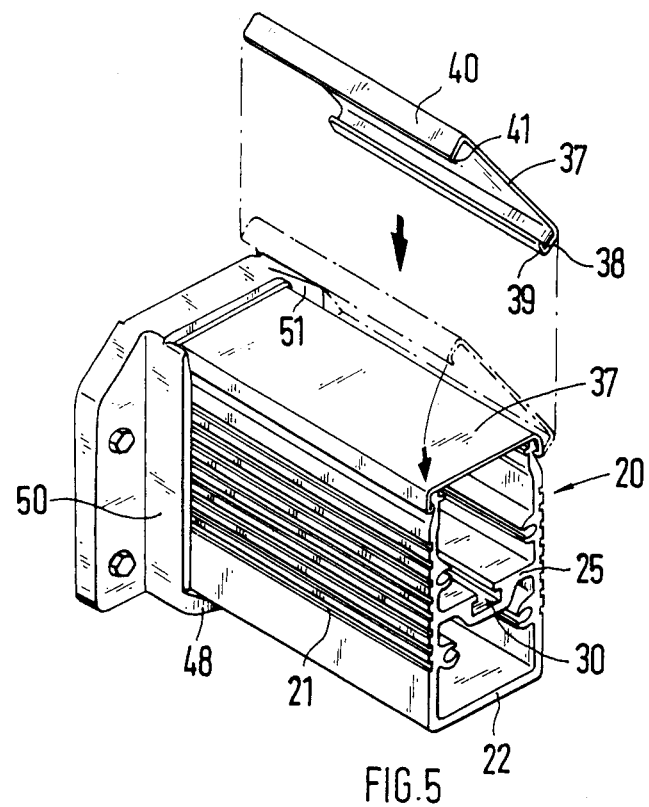
FIG. 5 shows attachment of the support body section to the mounting plate.

In FIG. 5 a position is shown in which the support body section (20) which consists of the base profile section (21) and the cover profile section (37) is connected with the mounting plate (44). It is apparent that the wall parts (48, 50 and 51) form a reception mount and guide for the assembled support body section (20).

The penetrating T-groove (30) in the separating bar (25) provides an additional mounting of the connection lines at any point in the longitudinal direction of the reception mounting part. The mounting element is thus constructed so that it can be inserted and by rotation fixed in a specific position into the T-groove (30).

We claim:

1. In a suspension apparatus for control devices and control panels which can be assembled from a connection flange and a connection rotary joint, support body sections, angle units, and intermediary joints connectable with a stationary body, and a coupling unit connectable with the control device and the control panel, the improvement comprising:

said support body sections (20) having an essentially U-shaped base profile section (21) which with a separating bar (25) parallel to a bar (22) is used to divide into a closed support part (TP) and an open U-shaped reception mounting part (AP) turned away from said bar (22);

a plurality of longitudinally directed connection bars (28, 29, 31, 32) having penetrating threaded reception mountings integrally formed on said support part (TP) and on said reception mounting part (AP);

a plurality of lateral limb sections (26, 27) of said reception mounting part (AP) proceeding into connection ends (33, 35) having longitudinally directed and penetrating rear-cut sections (34, 36); and a cover profile section (37) having a U-shaped cross section and lateral limbs (38, 40) having longitudinally directed and penetrating suspension or locking attachments (39, 41) removably connectable with said connection ends (33, 35) of said reception mounting profile (AP), whereby said mounting profile (AP) can be closed.

2. In a suspension apparatus according to claim 1, wherein:

said connection bars (28, 29, 31, 32) are integrally formed on internal sides of said lateral limb sections (23, 24, 26, 27) of said support part (TP) and of said reception mounting part (AP), whereby at least a pair of said connection bars (28, 29 and 31, 32) is positioned in said support part (TP) and in said reception mounting part (AP).

3. In a suspension apparatus according to claim 2, wherein:

said threaded reception mountings in said connection bars (28, 29, 31, 32) are opened with penetrating slot apertures whereby a slot aperture width is dimensioned so that said threaded reception mountings extend over more than 180 degrees.

4. In a suspension apparatus according to claim 3, wherein:

said threaded reception mountings of said connection bars (28, 29, 31, 32) are positioned with central longitudinal axes at approximately a same distance to said separating bar (25) which divides said base profile section (21) into said support part (TP) and said reception mounting part (AP).

5. In a suspension apparatus according to claim 4, wherein:

said separating bar (25) on a side oriented to said reception mounting part (AP) has a centered penetrating T-groove (30).

6. In a suspension apparatus according to claim 5, wherein:

said rear-cut sections (34, 36) are positioned on external sides of said lateral limb sections (26, 27) of said reception mounting part (AP) and said suspension and locking attachments (39, 41) are positioned on internal sides of said lateral limbs (38, 40) of said cover profile section (37).

7. In a suspension apparatus according to claim 6, wherein:

said connection ends (33, 35) of said lateral limb sections (26, 27) of said reception mounting part (AP) are displaced inwardly such that said cover profile section (37) connected with said reception mounting part (AP), with external sides of said lateral limbs (38, 40) closes snugly with said external sides of said lateral limb sections (26, 27) of said reception mounting part (AP) of said base profile section (21).

8. In a suspension apparatus according to claim 7, wherein:

said external sides of said lateral limb sections (23, 24, 26, 27) of said support part (TP) and said mounting part (AP) of said base profile section (21) have longitudinally directed grooves (42) positioned at a uniform distance relative to one another.

9. In a suspension apparatus according to claim 8, wherein:

said connection flange, said connection rotary joint, said angle unit, said intermediary joint and said coupling unit have a mounting plate (44) which supports screw connecting pieces (52) directed to said connection bars (28, 29, 31, 32) with said threaded reception mountings, and with integrally formed wall parts (48, 49, 50, 51), at least partially accommodates and guides said base profile section (21) on a circumferential side.

10. In a suspension apparatus according to claim 9, wherein:
said bar (22) of said base profile section (21) is mounted between said wall parts (48, 49) and a centering plate (45) integrally formed on said mounting plate (44);
an adjusting plate (46) integrally formed on said mounting plate (44) is supported with a clearance on said separating bar (25) of said base profile section (21);
a first threaded boring (47) mateable with an adjusting screw (57) abutting on said separating bar (25) is positioned in said adjusting plate (46); and
a mounting surface of said mounting plate (44) is inclined.

11. In a suspension apparatus according to claim 10, wherein:
a second threaded boring (53) for an adjusting screw which abuts on a front side of said separating bar (25) of said base profile section (21) of said support body section (20) is in said mounting plate (44).

12. In a suspension apparatus according to claim 9, wherein:
a threaded boring (53) for an adjusting screw which abuts on a front side of said separating bar (25) of said base profile section (21) of said support body section (20) is in said mounting plate (44).

13. In a suspension apparatus according to claim 2, wherein:
said threaded reception mountings in said connection bars (28, 29, 31, 32) are opened with penetrating slot apertures whereby a slot aperture width is dimensioned so that said threaded reception mountings extend over more than 270 degrees.

14. In a suspension apparatus according to claim 1, wherein:
said threaded reception mountings in said connection bars (28, 29, 31, 32) are opened with penetrating slot apertures, whereby a slot aperture width is dimensioned so that said threaded reception mountings extend over more than 270 degrees.

15. In a suspension apparatus according to claim 1, wherein:
said threaded reception mountings in said connection bars (28, 29, 31, 32) are opened with penetrating slot apertures whereby a slot aperture width is dimensioned so that said threaded reception mountings extend over more than 180 degrees.

16. In a suspension apparatus according to claim 1, wherein:
said threaded reception mountings of said connection bars (28, 29, 31, 32) are positioned with central longitudinal axes at approximately a same distance to said separating bar (25) which divides said base profile section (21) into said support part (TP) and said reception mounting part (AP).

17. In a suspension apparatus according to claim 1, wherein:
said separating bar (25) on a side oriented to said reception mounting part (AP) has a centered penetrating T-groove (30).

18. In a suspension apparatus according to claim 1, wherein:
said rear-cut sections (34, 36) are positioned on external sides of said lateral limb sections (26, 27) of said reception mounting part (AP) and said suspension and locking attachments (39, 41) are positioned on internal sides of said lateral limbs (38, 40) of said cover profile section (37).

19. In a suspension apparatus according to claim 1, wherein:
said connection ends (33, 35) of said lateral limb sections (26, 27) of said reception mounting part (AP) are displaced inwardly such that said cover profile section (37) connected with said reception mounting part (AP), with external sides of said lateral limbs (38, 40) closes snugly with said external sides of said lateral limb sections (26, 27) of said reception mounting part (AP) of said base profile section (21).

20. In a suspension apparatus according to claim 1, wherein:
said external sides of said lateral limb sections (23, 24, 26, 27) of said support part (TP) and said mounting part (AP) of said base profile section (21) have longitudinally directed grooves (42) positioned at a uniform distance relative to one another.

21. In a suspension apparatus according to claim 1, wherein:
said connection flange, said connection rotary joint, said angle unit, said intermediary joint and said coupling unit have a mounting plate (44) which supports screw connecting pieces (52) directed to said connection bars (28, 29, 31, 32) with said threaded reception mountings, and with integrally formed wall parts (48, 49, 50, 51), at least partially accommodates and guides said base profile section (21) on a circumferential side.

* * * * *